US011836317B2

(12) United States Patent
Yang et al.

(10) Patent No.: US 11,836,317 B2
(45) Date of Patent: Dec. 5, 2023

(54) TOUCHPAD AND ITS FORCE SENSING DATA CALIBRATION METHOD

(71) Applicant: ELAN MICROELECTRONICS CORPORATION, Hsinchu (TW)

(72) Inventors: Hsueh-Wei Yang, Zhubei (TW); Ying-Jie Liu, Zhubei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/849,390

(22) Filed: Jun. 24, 2022

(65) Prior Publication Data

US 2023/0012281 A1 Jan. 12, 2023

(30) Foreign Application Priority Data

Jul. 9, 2021 (TW) .................................. 110125384

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 2203/04105* (2013.01)

(58) Field of Classification Search
CPC .... G06F 3/0418; G06F 3/0446; G06F 3/0414; G06F 3/04142; G06F 3/04144; G06F 3/04146; G06F 3/04106; G06F 2203/04105
See application file for complete search history.

(56) References Cited

U.S. PATENT DOCUMENTS

| | | | | |
|---|---|---|---|---|
| 2017/0262112 A1* | 9/2017 | Noguchi | ............. | G02F 1/13338 |
| 2017/0277329 A1* | 9/2017 | Ding | ..................... | G06F 3/0446 |
| 2018/0059852 A1* | 3/2018 | Sterling | ............ | G06F 3/041662 |
| 2018/0210599 A1* | 7/2018 | Seo | ......................... | G06F 3/041 |
| 2019/0113998 A1* | 4/2019 | Cao | ...................... | G06F 3/0446 |
| 2020/0310583 A1* | 10/2020 | La | .......................... | H03K 17/96 |
| 2020/0371634 A1* | 11/2020 | Maekawa | ............ | G06F 3/0418 |
| 2021/0141507 A1* | 5/2021 | Micci | .................. | G06F 3/04186 |
| 2022/0206628 A1* | 6/2022 | Chang | .................. | G06F 3/0447 |

* cited by examiner

*Primary Examiner* — Darlene M Ritchie
(74) *Attorney, Agent, or Firm* — patenttm.us

(57) ABSTRACT

A touchpad and its force-sensing data correction method are provided. The touchpad has a force-sensing layer and a touch-sensing layer. The force-sensing layer has multiple force-sensing points. The touch-sensing layer has multiple touch-sensing points. One force-sensing point corresponds to n touch-sensing points. The force-sensing information received by the force-sensing layer is adjusted by using the touch-sensing information received by the touch-sensing layer, so that the resolution of the adjusted force-sensing information is higher than the resolution of the original received force-sensing information. In this way, the purpose of calibrating the force-sensing information is achieved, so as to improve the accuracy of determining the force applied by the object during the operation of the touchpad.

20 Claims, 16 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 23 | -20 | -24 | -32 | -28 | -24 | -36 | -32 | -24 | -28 | -24 | -20 | -16 | -20 | 4 | -8 | 44 |
| 22 | -48 | -68 | -52 | -68 | -72 | -96 | -72 | -100 | -100 | -72 | -52 | -52 | -40 | -20 | -36 | 12 |
| 21 | -44 | -52 | -72 | -68 | -68 | -64 | -80 | -92 | -84 | -52 | -48 | -44 | -36 | -16 | -32 | 8 |
| 20 | -20 | -24 | -32 | -28 | -36 | -32 | -24 | -44 | -32 | -4 | 4 | 0 | 12 | -24 | 4 | -48 |
| 19 | -40 | -44 | -44 | -48 | -24 | -24 | -20 | -32 | -16 | -12 | 4 | -4 | -20 | 0 | -24 | 12 |
| 18 | -36 | -48 | -40 | -44 | -8 | -4 | 4 | 4 | 4 | 16 | 12 | 16 | -8 | -16 | -20 | 16 |
| 17 | -32 | -36 | -32 | -28 | 16 | 24 | 44 | 484 | 692 | 64 | 48 | 8 | 8 | 8 | -16 | 20 |
| 16 | -28 | -20 | -12 | -20 | 12 | 28 | 144 | 2196 | 2196 | 308 | 48 | 24 | 0 | 48 | 4 | 41 |
| 15 | -16 | -12 | -32 | -12 | 36 | 60 | 68 | 1452 | 1924 | 176 | 24 | 4 | 0 | 28 | -12 | 24 |
| 14 | -20 | -24 | -8 | -20 | 24 | 44 | 77 | 124 | 124 | 60 | 52 | 20 | 0 | 12 | -12 | 16 |
| 13 | -16 | 0 | -12 | 4 | 24 | 21 | 40 | 56 | 56 | 52 | 40 | 12 | -4 | 4 | -16 | 12 |
| 12 | -12 | -8 | -4 | 0 | 12 | 28 | 28 | 28 | 24 | 32 | 16 | -4 | -8 | 4 | -16 | 20 |
| 11 | -12 | -12 | -16 | 0 | 24 | 40 | 68 | 56 | 44 | 24 | 8 | 8 | -8 | -8 | -8 | 8 |
| 10 | 0 | -16 | -16 | 0 | -8 | 44 | 140 | 1020 | 592 | 16 | 20 | -8 | -12 | -16 | -4 | 16 |
| 9 | 0 | -16 | -16 | -12 | 8 | 28 | 32 | 492 | 3856 | 144 | 36 | 16 | -8 | 0 | -16 | 16 |
| 8 | -8 | -8 | -20 | 0 | -12 | -16 | 56 | 176 | 1728 | 1076 | 44 | 24 | -12 | -4 | -20 | 8 |
| 7 | 0 | 4 | 4 | -4 | 12 | 4 | 28 | 56 | 80 | 72 | 44 | 12 | 8 | 0 | -4 | -28 |
| 6 | -4 | -12 | 0 | 4 | -4 | 4 | 4 | 0 | 12 | 0 | 4 | 0 | 0 | 0 | -12 | 8 |
| 5 | 12 | 8 | 12 | 4 | 4 | 12 | 0 | 4 | 4 | -4 | 0 | 0 | 4 | -4 | 12 | -32 |
| 4 | -4 | 4 | 0 | -16 | -12 | -12 | -32 | -28 | -32 | -24 | -20 | -8 | 0 | 0 | 0 | -8 |
| 3 | 20 | 12 | 4 | 4 | 4 | -16 | -28 | -28 | -24 | -20 | 0 | -4 | 0 | 0 | 12 | 12 |
| 2 | 16 | 20 | 24 | 20 | 8 | 4 | -12 | -20 | -16 | -16 | -12 | 0 | 4 | 0 | 12 | -12 |
| 1 | 16 | 16 | 16 | 4 | -12 | -20 | -24 | -28 | -36 | -28 | -20 | -8 | 0 | -4 | 0 | 8 |
| 0 | 0 | 5 | 4 | 12 | 0 | -4 | -20 | -36 | -24 | -16 | -12 | 0 | 0 | 8 | 4 | 16 |

| | 0 | 1 | 2 | 3 | 4 | 5 | 6 | 7 |
|---|---|---|---|---|---|---|---|---|
| 0 | 5 | 7 | 6 | 9 | 5 | 5 | 9 | 7 |
| 1 | -1 | 21 | 27 | 26 | 23 | 26 | 29 | 21 |
| 2 | 3 | 23 | 43 | 40 | 33 | 47 | 37 | 23 |
| 3 | 2 | 26 | 59 | 59 | 46 | 77 | 57 | 26 |
| 4 | 7 | 27 | 68 | 88 | 82 | 105 | 73 | 27 |
| 5 | 8 | 33 | 83 | 113 | 120 | 149 | 92 | 33 |
| 6 | 5 | 31 | 92 | 128 | 161 | 211 | 100 | 31 |
| 7 | 6 | 34 | 96 | 125 | 184 | 234 | 109 | 34 |
| 8 | 2 | 33 | 94 | 114 | 182 | 258 | 126 | 33 |
| 9 | 5 | 35 | 91 | 120 | 187 | 275 | 171 | 35 |
| 10 | 5 | 38 | 80 | 108 | 152 | 208 | 161 | 38 |
| 11 | 4 | 41 | 65 | 80 | 105 | 141 | 108 | 41 |
| 12 | 1 | 31 | 44 | 64 | 78 | 86 | 59 | 31 |
| 13 | 1 | 27 | 35 | 43 | 54 | 55 | 39 | 27 |
| 14 | 0 | 27 | 19 | 30 | 35 | 32 | 28 | 27 |
| 15 | -1 | 12 | 9 | 9 | 13 | 13 | 15 | 12 |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 5 | -1 | 3 | 2 | 7 | 8 | 5 | 6 | 2 | 5 | 5 | 4 | 1 | 1 | 0 | -1 |
| 1 | 5 | -1 | 3 | 2 | 7 | 8 | 5 | 6 | 2 | 5 | 5 | 4 | 1 | 1 | 0 | -1 |
| 2 | 5 | -1 | 3 | 2 | 7 | 8 | 5 | 6 | 2 | 5 | 5 | 4 | 1 | 1 | 0 | -1 |
| 3 | 3 | 10 | 22 | 25 | 31 | 34 | 33 | 38 | 38 | 35 | 33 | 27 | 18 | 14 | 8 | 3 |
| 4 | 3 | 10 | 22 | 25 | 31 | 34 | 33 | 38 | 38 | 35 | 33 | 27 | 18 | 14 | 8 | 3 |
| 5 | 3 | 10 | 22 | 25 | 31 | 34 | 33 | 38 | 38 | 35 | 33 | 27 | 18 | 14 | 8 | 3 |
| 6 | 6 | 27 | 43 | 59 | 68 | 83 | 92 | 96 | 94 | 91 | 80 | 65 | 44 | 35 | 19 | 9 |
| 7 | 6 | 27 | 43 | 59 | 68 | 83 | 92 | 96 | 94 | 91 | 80 | 65 | 44 | 35 | 19 | 9 |
| 8 | 6 | 27 | 43 | 59 | 68 | 83 | 92 | 96 | 94 | 91 | 80 | 65 | 44 | 35 | 19 | 9 |
| 9 | 9 | 26 | 40 | 59 | 88 | 113 | 128 | 125 | 114 | 120 | 108 | 80 | 64 | 43 | 30 | 9 |
| 10 | 9 | 26 | 40 | 59 | 88 | 113 | 128 | 125 | 114 | 120 | 108 | 80 | 64 | 43 | 30 | 9 |
| 11 | 9 | 26 | 40 | 59 | 88 | 113 | 128 | 125 | 114 | 120 | 108 | 80 | 64 | 43 | 30 | 9 |
| 12 | 5 | 23 | 33 | 46 | 82 | 120 | 161 | 184 | 182 | 187 | 152 | 105 | 78 | 54 | 55 | 13 |
| 13 | 5 | 23 | 33 | 46 | 82 | 120 | 161 | 184 | 182 | 187 | 152 | 105 | 78 | 54 | 55 | 13 |
| 14 | 5 | 23 | 33 | 46 | 82 | 120 | 161 | 184 | 182 | 187 | 152 | 105 | 78 | 54 | 55 | 13 |
| 15 | 5 | 26 | 47 | 77 | 105 | 149 | 211 | 234 | 258 | 275 | 208 | 141 | 86 | 55 | 32 | 13 |
| 16 | 5 | 26 | 47 | 77 | 105 | 149 | 211 | 234 | 258 | 275 | 208 | 141 | 86 | 55 | 32 | 13 |
| 17 | 5 | 26 | 47 | 77 | 105 | 149 | 211 | 234 | 258 | 275 | 208 | 141 | 86 | 55 | 32 | 13 |
| 18 | 9 | 29 | 37 | 57 | 73 | 92 | 100 | 109 | 126 | 171 | 161 | 108 | 59 | 39 | 28 | 15 |
| 19 | 9 | 29 | 37 | 57 | 73 | 92 | 100 | 109 | 126 | 171 | 161 | 108 | 59 | 39 | 28 | 15 |
| 20 | 9 | 29 | 37 | 57 | 73 | 92 | 100 | 109 | 126 | 171 | 161 | 108 | 59 | 39 | 28 | 15 |
| 21 | 7 | 21 | 23 | 26 | 27 | 33 | 31 | 34 | 33 | 35 | 38 | 41 | 31 | 27 | 27 | 12 |
| 22 | 7 | 21 | 23 | 26 | 27 | 33 | 31 | 34 | 33 | 35 | 38 | 41 | 31 | 27 | 27 | 12 |
| 23 | 7 | 21 | 23 | 26 | 27 | 33 | 31 | 34 | 33 | 35 | 38 | 41 | 31 | 27 | 27 | 12 |

TOUCHPAD AND ITS FORCE SENSING DATA CALIBRATION METHOD

CROSS-REFERENCE TO RELATED APPLICATIONS

This application is based upon and claims priority under 35 U.S.C. 119 from Taiwan Patent Application No. 110125384 filed on Jul. 9, 2021, which is hereby specifically incorporated herein by this reference thereto.

BACKGROUND OF THE INVENTION

1. Field of the Invention

The present invention relates to a touchpad, especially relating to the field of adjusting the force-sensing information.

2. Description of the Prior Arts

As the functions provided by touchpads increase day by day, in addition to the original touch-sensing functions, many touchpads also add force-sensing functions. The touchpad has a touch electrode layer, a force-sensing layer and a deformable spacer layer. The deformable spacer layer is disposed between the touch electrode layer and the force-sensing layer. By the deformation of the deformable spacer layer, the force-sensing layer detects the force exerted on the touch electrode layer.

Due to the limitation of cost and the number of IC pins, the resolution of the force-sensing layer of the conventional touchpad is lower than that of the touch electrode layer. Therefore, on the same unit area, the touch-sensing points formed by the touch electrode layer are more than the force-sensing points formed by the force-sensing layer. In other words, the distance between adjacent force-sensing points is larger. When the object is operated on and pressed down the touchpad, the corresponding capacitance-sensing variation generated at each force-sensing point is used as information about the force-sensing amount for judging the pressing force of each object. However, due to the large distance between adjacent force-sensing points, each force-sensing point may be affected by the force of the objects close to each other, and cannot correctly reflect the downward force of each object when the objects are touched and pressed at the same time. Thus, the conventional touchpad is inaccurate when judging force-sensing information.

SUMMARY OF THE INVENTION

To overcome the shortcomings, the present invention provides a force-sensing data calibration method of a touchpad to mitigate or to obviate the aforementioned problems.

To achieve the objective, a touchpad is provided and comprises a force-sensing layer including multiple force-sensing points arranged in a matrix; a touch-sensing layer including multiple touch-sensing points arranged in a matrix, and each of the force-sensing points corresponds to n of the touch-sensing points, n is a positive integer greater than 1; a protective layer, and the touch-sensing layer disposed between the substrate and the protective layer; a deformable unit disposed between the substrate the touch-sensing layer; and a controller electrically connected to the force-sensing layer and the touch-sensing layer, and executing a force-sensing data calibration method.

The force-sensing data calibration method comprises steps of: a. receiving a first force-sensing information detected by the force-sensing layer, and receiving a touch-sensing information detected by the touch-sensing layer; and b. adjusting the first force-sensing information according to the touch-sensing information to obtain a second force-sensing information, wherein a resolution of the second force-sensing information is greater than a resolution of the first force-sensing information.

The advantage of the present invention is that the first force-sensing information sensed by the force-sensing layer is adjusted to the second force-sensing information with a higher resolution by using the touch-sensing information with a higher resolution as a reference. Thereby, the purpose of correcting the force-sensing information is achieved, so as to improve the accuracy of judging the magnitude of the force applied by the object when the touchpad is operated.

Other objectives, advantages and novel features of the invention will become more apparent from the following detailed description when taken in conjunction with the accompanying drawings.

BRIEF DESCRIPTION OF THE DRAWINGS

FIGS. 4A and 4B are illustrative views of the touch-sensing information of a force-sensing data calibration method in accordance with the present invention;

FIG. 5 is an illustrative view of a first force-sensing information of a force-sensing data calibration method in accordance with the present invention;

FIGS. 6A and 6B are illustrative views of a third force-sensing information of a force-sensing data calibration method in accordance with the present invention;

FIG. 9A is an illustrative view of a third embodiment of a second force-sensing information of a force-sensing data calibration method in accordance with the present invention;

FIG. 10A is an illustrative view of an initial state of a fourth embodiment of a second force-sensing information of a force-sensing data calibration method in accordance with the present invention;

FIG. 10B is an illustrative view of a final state of the second force-sensing information in FIG. 10A;

DETAILED DESCRIPTION OF THE EMBODIMENTS

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, or the actual ratio. Some of the dimensions or dimension ratios have been enlarged or simplified to provide a better illustration. The actual numbers, actual shapes, or actual dimension ratios can be selectively designed and disposed and the detailed component layouts may be more complicated.

Figure 1A:
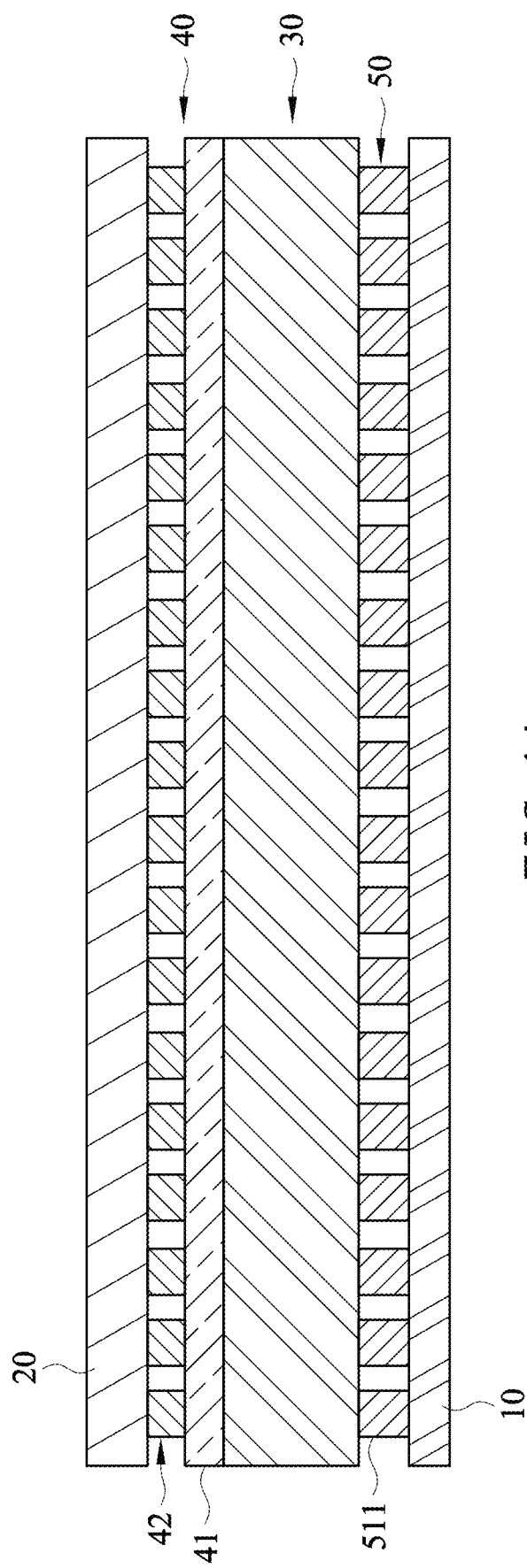
FIG. 1A is a side view in partial section of a touchpad in accordance with the present invention.
Figure 1B:
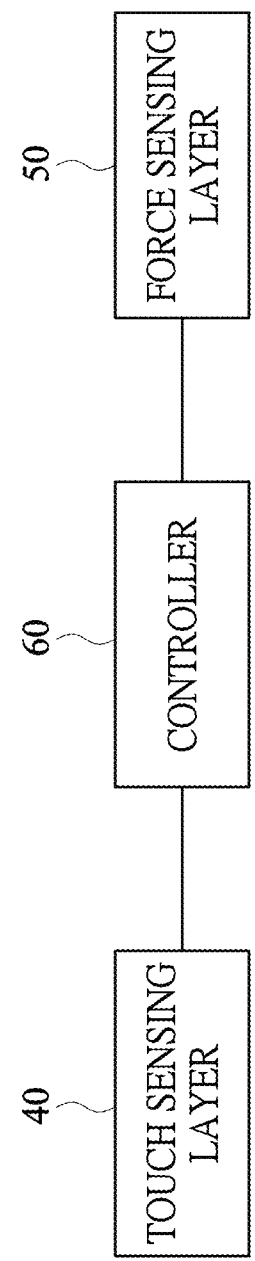
FIG. 1B is a block diagram of a part of the elements of the touchpad in FIG. 1A.

With reference to FIGS. 1A and 1B, a touchpad in accordance with the present invention comprises a substrate 10, a protective layer 20, a deformable unit 30, a touch-sensing layer 40, a force-sensing layer 50 and a controller 60. The deformable unit 30 is disposed between the substrate 10 and the protective layer 20. The touch-sensing layer 40 is disposed between the protective layer 20 and the deformable unit 30. The force-sensing layer 50 is disposed between the deformable unit 30 and the substrate 10. In one embodiment, the force-sensing layer 50 is mounted on the substrate 10. The controller 60 is electrically connected to the force-sensing layer 50 and the touch-sensing layer 40 through the substrate 10.

Figure 2:
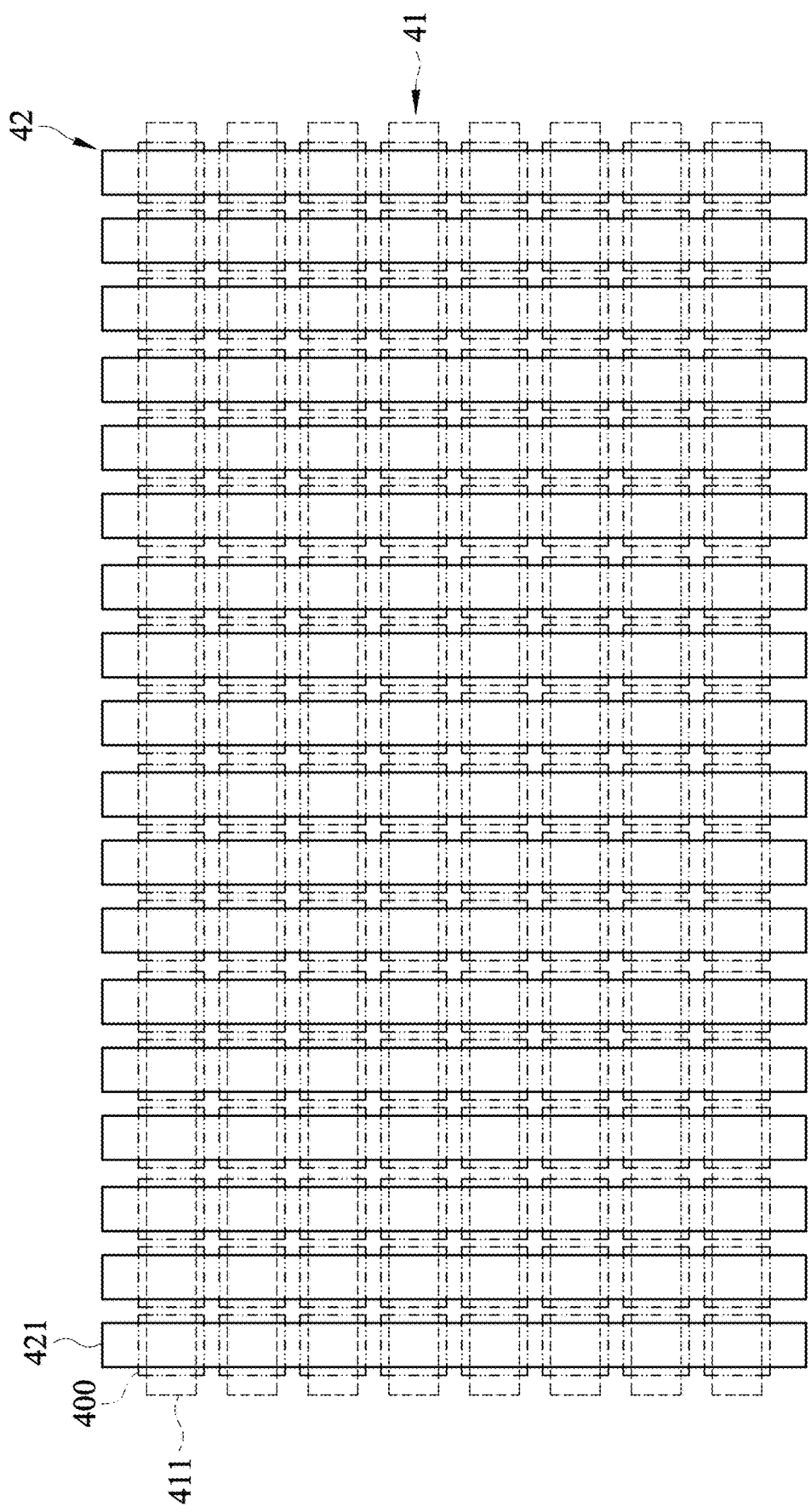
FIG. 2 is an illustrative view of the sensing traces of the touch-sensing layer of the touchpad in FIG. 1.
Figure 3:
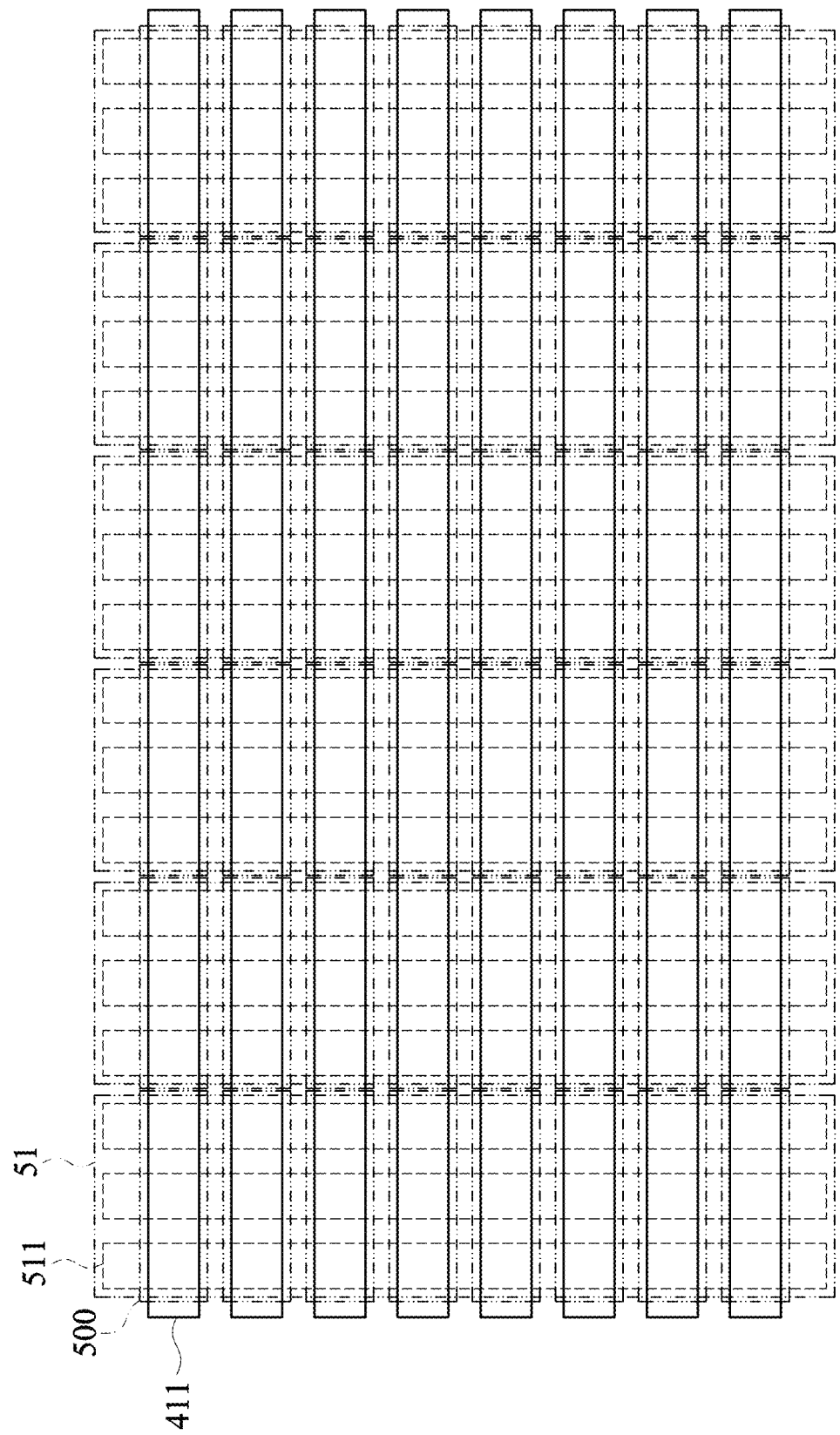
FIG. 3 is an illustrative view of the driving traces and the force-sensing traces of the touchpad in FIG. 1.

With reference to FIGS. 1 to 3, the touch-sensing layer 40 includes multiple touch-sensing points 400 arranged in a matrix. The force-sensing layer 50 includes multiple force-sensing points 500 arranged in a matrix. A coverage of each force-sensing point 500 corresponds to a coverage of n force-sensing points 400. The "n" is a positive integer greater than 1. As the embodiment shown in FIGS. 2 and 3, one of the force-sensing points 500 corresponds to three of the touch-sensing points 400.

With reference to FIG. 1, in one embodiment, the touch-sensing layer 40 comprises a driving electrode layer 41 and a receiving electrode layer 42. The driving electrode layer 41 is disposed between the receiving electrode layer 42 and the force-sensing layer 50. The driving electrode layer 41 and the receiving electrode layer 42 generate coupling capacitance as a touch-sensing information TI. The driving electrode layer 41 and the force-sensing layer 50 generate coupling capacitance as a first force-sensing information $FI_1$.

With reference to FIGS. 1 to 3, in one embodiment, the driving electrode layer 41 includes multiple driving traces 411. The driving traces 411 are arranged in parallel and spaced apart. The receiving electrode layer 42 includes multiple receiving traces 421. The receiving traces 421 are arranged in parallel and spaced apart. The driving traces 411 are perpendicular to the receiving traces 421. The force-sensing layer 50 includes multiple sub-force sensing traces 511. The sub force-sensing traces 511 are arranged in parallel and spaced apart. Each sub force-sensing trace 511 aligns with one of the receiving traces 421 and is perpendicular to the driving traces 411. The adjacent n sub force-sensing traces 511 are connected in parallel to form a force-sensing trace 51 so that each of the force-sensing traces 51 corresponds to n of the receiving traces 421. An intersection point of one of the driving traces 411 and one of the receiving races 421 is one of the touch-sensing points 400. An intersection point of one of the driving traces 411 and one of the force-sensing traces 51 is one of the force-sensing points 400. Taking z driving traces 411, x force-sensing traces 51, and y receiving traces 421 as an example, x*z force-sensing points 500 and y*z touch-sensing points 400 are formed, where x*n=y. The "x" and "z" are positive integers greater than or equal to 1, and the "y" is a positive integer greater than 1.

When a plurality of objects contact the protective layer 20, each of the touch-sensing points 400 generates different coupling capacitances corresponding to the distance between the touch points of the touch objects. Each of the force-sensing points 500 also generates different coupling capacitances corresponding to the downward pressure of the touch object. For example, as shown in FIG. 4A, the sensing value matrix drawn by the coupling capacitances generated by each touch-sensing point 400 constitutes a touch-sensing information TI. As shown in FIG. 5, the sensing value matrix drawn by the coupling capacitances generated by each force-sensing point 500 constitutes a first force-sensing information $FI_1$. Since the number of the force-sensing points 500 is 1/n of the number of the touch-sensing points 400, the resolution of the first force-sensing information $FI_1$ is lower than that of the touch-sensing information TI. The controller 60 adjusts the first force-sensing information $FI_1$ according to the touch-sensing information TI to obtain a second force-sensing information with a higher resolution so as to improve the accuracy of judging the force and coordinate of the touch object. The following describes different embodiments of a calibration method in accordance with the present invention for adjusting the first force-sensing information $FI_1$ according to the touch-sensing information TI, and takes the touch-sensing information TI (including 24*16 touch-sensing values 401, each of the touch-sensing values 401 corresponding to the capacitance variation of each of the touch-sensing points 400) shown in FIG. 4A and the first force-sensing information $FI_1$ (including 8*16 first force-sensing values 501, and each of the first force-sensing values 501 corresponds to the capacitance variation of each of the force-sensing points 500) shown in FIG. 5 as examples, but not limited thereto.

First Embodiment

Figure 6B:
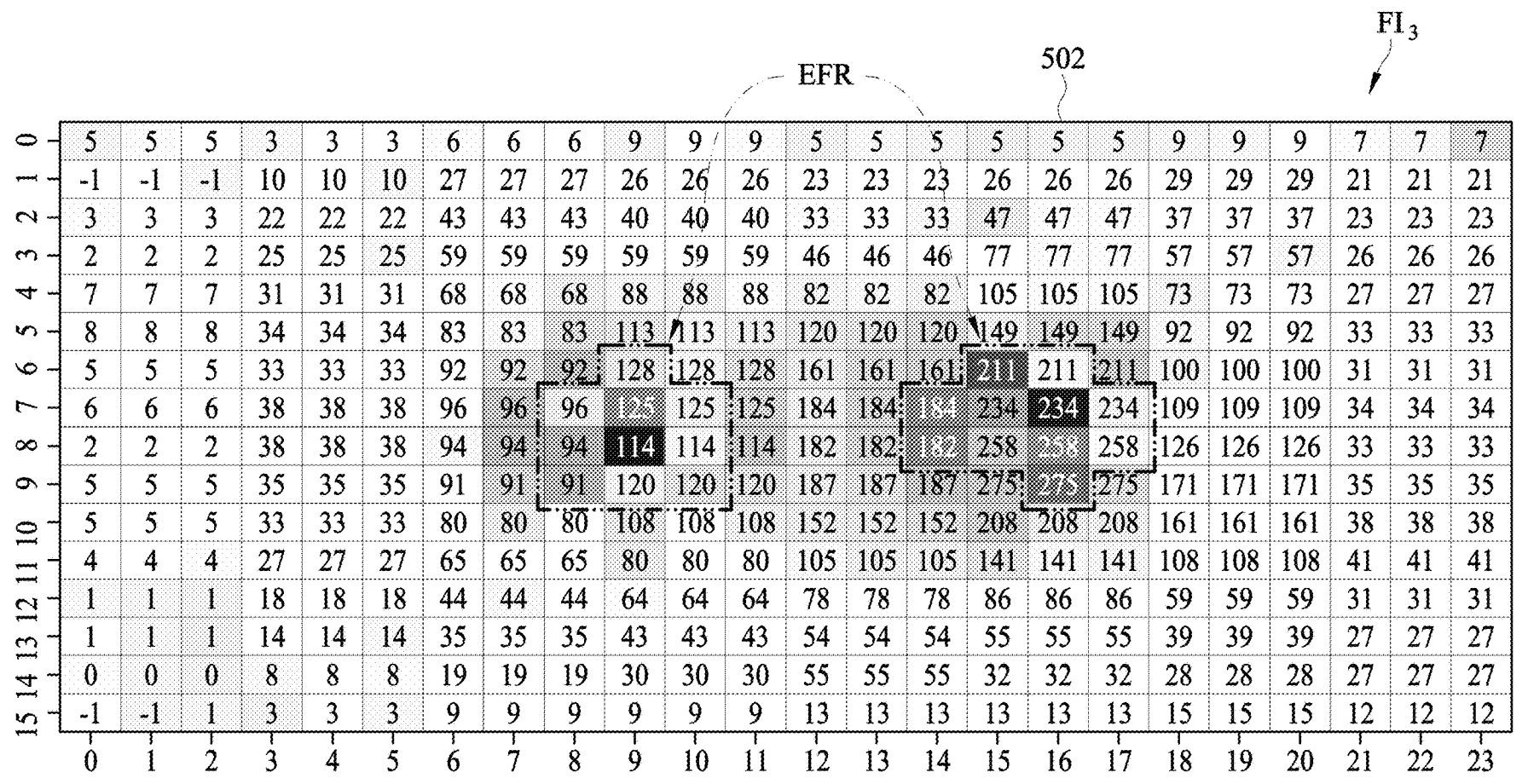
Figure 7:
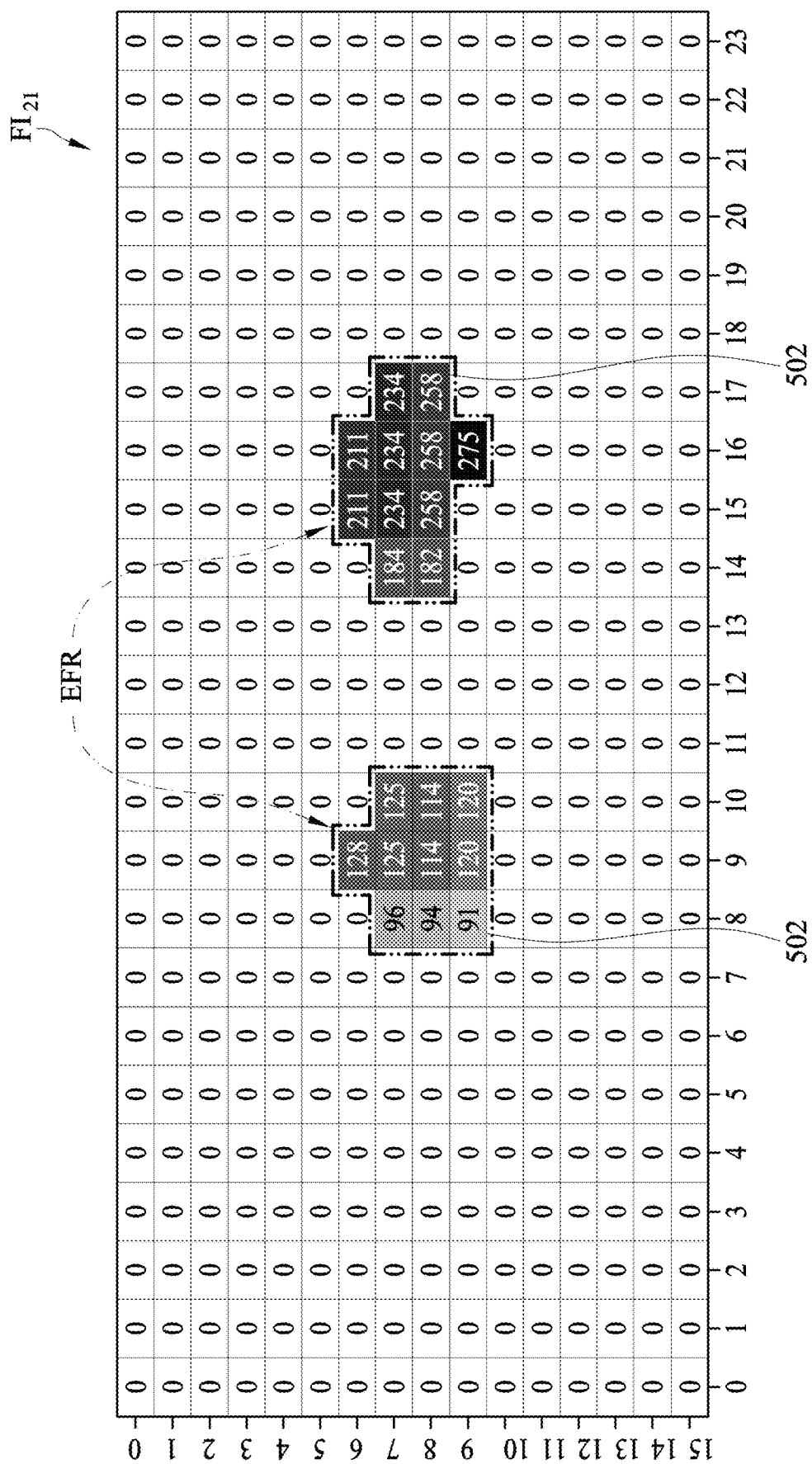
FIG. 7 is an illustrative view of a first embodiment of a second force-sensing information of a force-sensing data calibration method in accordance with the present invention.

With reference to FIGS. 4A to 7, the first force-sensing values 501 (as shown in FIG. 5) in the first force-sensing information $FI_1$ are designated as the n second force-sensing values 502 according to the coordinates of the n touch-sensing points 400 (as shown in FIG. 6A). The second force-sensing values 502 constitute a third force-sensing information $FI_3$. Then, the resolution of the first force-sensing information $FI_1$ (8*16) is expanded to the resolution of the third force-sensing information $FI_3$ (24*16). The resolution of the third force-sensing information $FI_3$ is proportional to the resolution of the touch-sensing information TI, and then the third force-sensing information $FI_3$ is adjusted according to the touch-sensing information TI to obtain the second force-sensing information $FI_{21}$. In this embodiment, the aforementioned calibration method selects an effective touch range ETR according to the touch-sensing information TI (as shown in FIG. 4B). Then, according to the effective touch range ETR, an orthographic projection in the third force-sensing information $FI_3$ correspondingly obtains an effective force-sensing range EFR (as shown in FIG. 6B). Next, the second force-sensing values 502 in the effective force-sensing range EFR are used to constitute the second force-sensing information $FI_{21}$ (as shown in FIG. 7). The effective touch range ETR may be the coordinate and contour range of the touch object relative to the touchpad. For example, for the touch-sensing information TI shown in FIG. 4A, it is assumed that the sensing value is greater than 100 as the effective sensing value. As shown in FIG. 4B, the coordinates (8,7)~(8,9), (9,6)~(9,9), and (10,7)~(10,9) are selected as an effective touch range ETR. The coordinates (14,7)~(14,8), (15,6)~(15,8), (16,6)~(16,9), and (17,7)~(17,8) are selected as another effective touch range ETR. In the third force-sensing information $FI_3$ shown in FIG. 6B, the orthographic projection corresponding to the coordinates (8,7)~(8,9), (9,6)~(9,9), and (10,7)~(10,9) is an effective force-sensing range EFR. The orthographic projection corresponding to the coordinates (14,7)~(14,8), (15,6)~(15,8), (16,6)~(16,9), and (17,7)~(17,8) is another effective force-sensing range EFR. Then, as shown in FIG. 7, the second force-sensing information $FI_{21}$ is constituted of the second force-sensing values 502 in the corresponding effective force-sensing ranges EFR. The second force-sensing values 502 in the remaining unselected areas may be ignored or regarded as 0 in the second force-sensing information $FI_{21}$. The obtained second force-sensing information $FI_{21}$ is determined according to the effective touch range ETR by the touch-sensing information TI. Therefore, the noise interference in the non-object touching area is excluded, and the accuracy of judging the force exerted by the object is effectively improved.

Second Embodiment

Figure 8A:
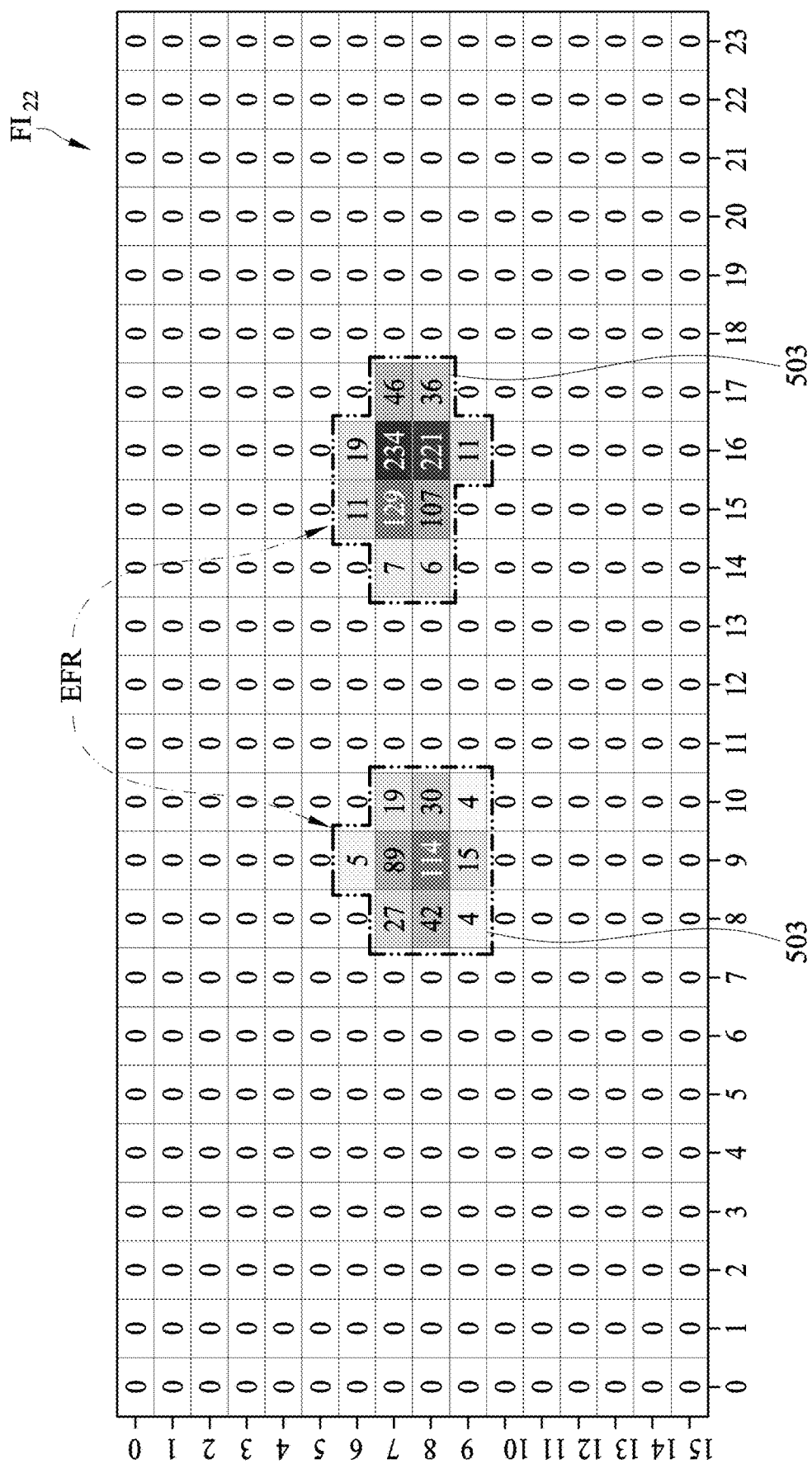
FIG. 8A is an illustrative view of a second embodiment of a second force-sensing information of a force-sensing data calibration method in accordance with the present invention.

With reference to FIGS. 4A to 6C and 8A, the first force-sensing values 501 (as shown in FIG. 5) in the first force-sensing information $FI_1$ are designated as the n second force-sensing values 502 according to the coordinates of the n touch-sensing points 400 (as shown in FIG. 6A). The second force-sensing value 502 constitutes a third force-sensing information $FI_3$. Then the resolution of the first force-sensing information $FI_1$ (8*16) is expanded to the resolution of the third force-sensing information $FI_3$ (24*16) to match the resolution of the touch-sensing information TI. The third force-sensing information $FI_3$ is adjusted according to the touch-sensing information TI to obtain the second force-sensing information $FI_{21}$. In this embodiment, the aforementioned calibration method selects an effective touch range ETR according to the touch-sensing information TI (as shown in FIG. 4B). Then according to the effective touch range ETR, an orthographic projection in the third force-sensing information $FI_3$ correspondingly obtains an effective force-sensing range EFR (as shown in FIG. 6B). Then, a correction value is extracted from the touch-sensing values 401 corresponding to the effective touch range EFR. Then, each of the second force-sensing values 502 in the effective force-sensing range EFR is calculated according to the correction value to obtain a corresponding third force-sensing value 503. The second force-sensing information $FI_{22}$ is constituted by the third force-sensing value 503. For example, for the touch-sensing information TI shown in FIG. 4A, it is assumed that the sensing value is greater than 100 as the effective sensing value. As shown in FIG. 4B, the coordinates (8,7)~(8,9), (9,6)~(9,9), and (10,7)~(10,9) are selected as an effective touch range ETR. The coordinates (14,7)~(14,8), (15,6)~(15,8), (16,6)~(16,9), and (17,7)~(17,8) are selected as another effective touch range ETR. In each effective touch range ETR, a value is determined as a correction value, such as the maximum value in the effective touch range ETR. In the third force-sensing information $FI_3$ shown in FIG. 6B, the orthographic projection corresponding to the coordinates (8,7)~(8,9), (9,6)~(9,9), and (10,7)~(10,9) is an effective force-sensing range EFR. The orthographic projection corresponding to the coordinates (14,7)~(14,8), (15,6)~(15,8), (16,6)~(16,9), and (17,7)~(17,8) is another effective force-sensing range EFR. Finally, the third force-sensing value 503 shown in FIG. 8A is obtained after the second force-sensing value 502 in the corresponding effective force-sensing range EFR is corrected by the correction value. The second force-sensing information $FI_{22}$ is constituted by the third force-sensing value 503. Many kinds of operation formulas may be used, and the following formulas are examples, but not limited thereto. The following calculation symbols are used, "e" represents the second force-sensing value, "f" represents the touch-sensing value, and "g" represents the correction value. The formula may be:

$$\text{The third force sensing value} = e \times \frac{f}{g}$$

Figure 8B:
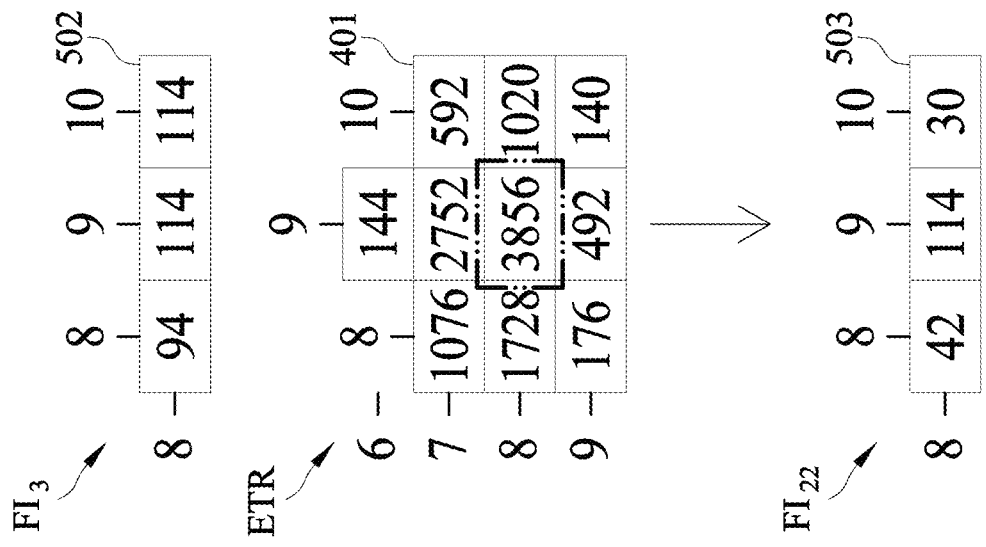
FIG. 8B is an illustrative view of a calculation of the second force-sensing information in FIG. 8A.

For example, the second force-sensing value 502 of the coordinates (8, 8) to (10, 8) in the third force-sensing information $FI_3$ shown in FIG. 8B are used as an example. The second force-sensing values 502 of these coordinates are 94, 114, and 114, respectively. The maximum touch-sensing value 401 selected in the corresponding effective touch-sensing range ETR is 3856 as the correction value. The third force-sensing values 503 obtained in the second force-sensing information $FI_{22}$ are 42, 114, and 30, respectively, after calculation according to the aforementioned formula. In this way, in addition to eliminating the noise interference in the non-object touch area through the effective touch range ETR, the accuracy of judging the force applied by the object is effectively improved. The force-sensing values are corrected through the touch-sensing value, so that the force-sensing information is more in line with the shape of the area touched by the touch object, and the accuracy of the force-sensing information is improved.

Third Embodiment

Figure 9A:
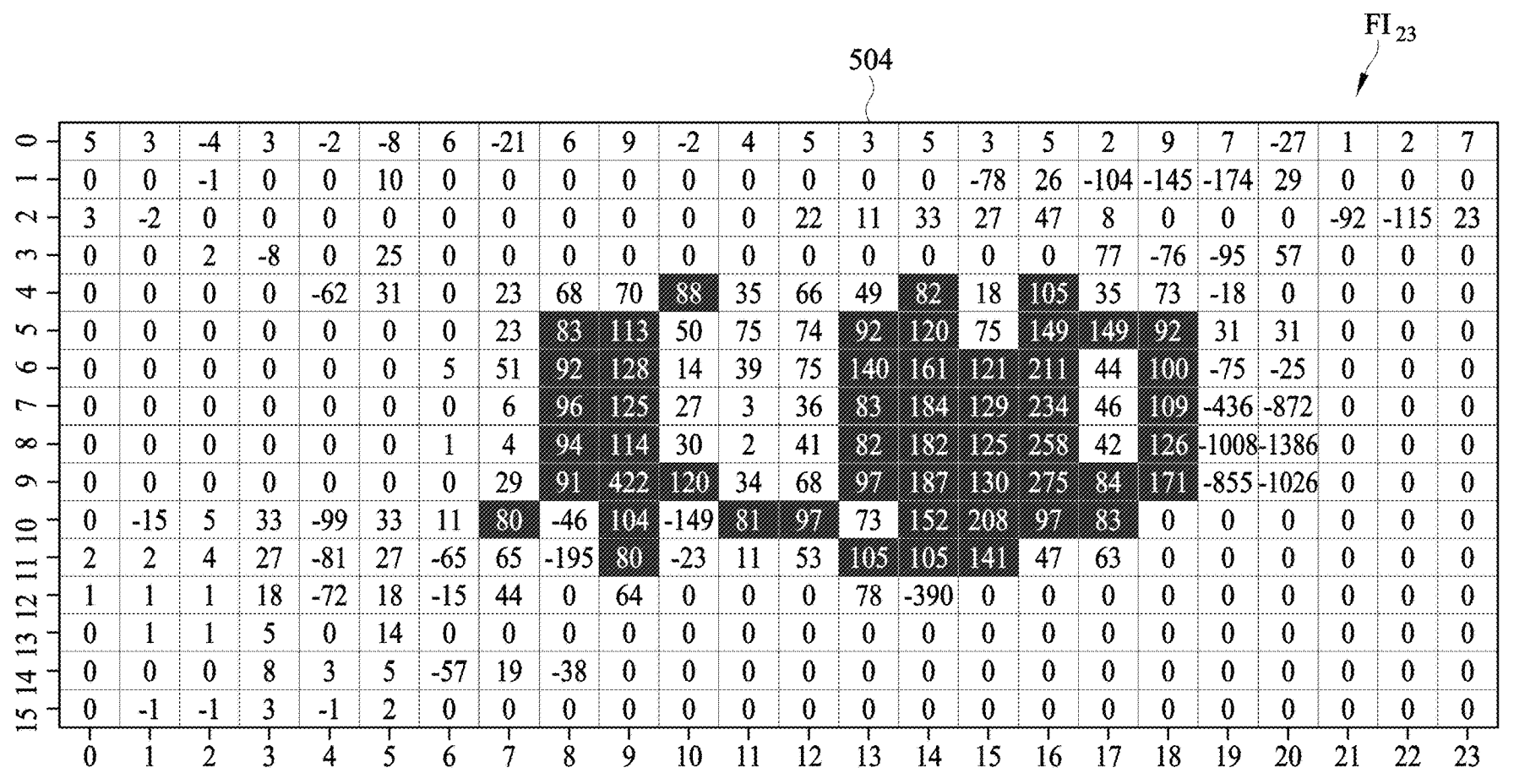
Figure 9B:
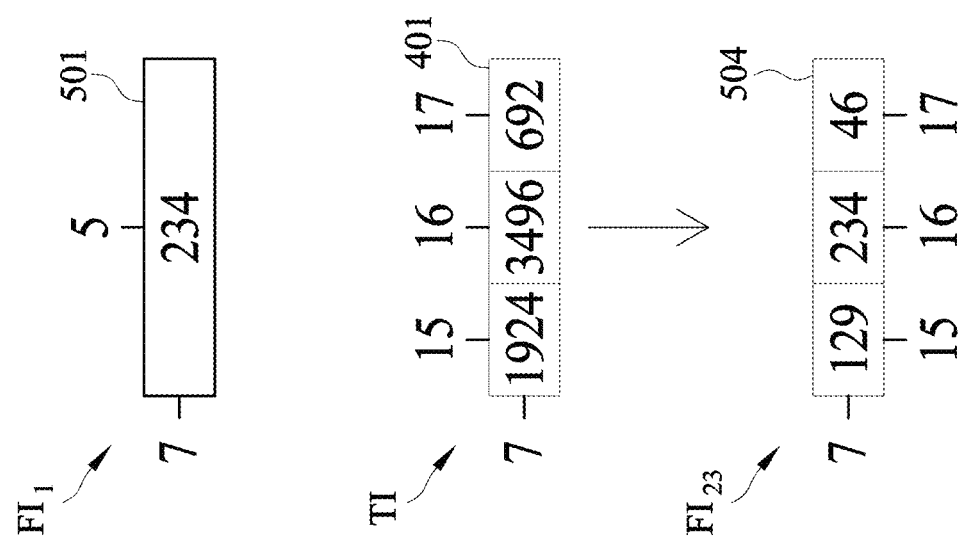
FIG. 9B is an illustrative view of a calculation of the second force-sensing information in FIG. 9A.

With reference to FIGS. 4A, 5 and 9, the first force-sensing values 501 (as shown in FIG. 5) in the first force-sensing information $FI_1$ correspond to the coordinates of the n touch-sensing points 400 (as shown in FIG. 4A). A base value is retrieved from the n touch-sensing values 401. The base value may be the maximum value, the average value or the sum value of the n touch-sensing values 401. After each of the first force-sensing values 501 is calculated according to the corresponding base value, n fourth force-sensing values 504 are obtained (as shown in FIG. 9A). The second force-sensing information $FI_{23}$ is constituted by the fourth force-sensing values 504. Many kinds of operation formulas may be used, and the following formulas are examples, but not limited thereto. As shown in FIG. 9B, one of the first force-sensing values 501 corresponds to three of the touch-sensing values 401. For example, the first force-sensing value of the coordinate (5,7) in the first force-sensing information $FI_1$ is used as an example, which corresponds to the coordinates (15,7)~(17,7) in the touch-sensing information TI. The maximum value of the touch-sensing values of the coordinates (15,7)~(17,7) is 3496, which is used as the base value. The following calculation symbols are used, " " represents the first force-sensing value, "j" represents the touch-sensing value, and "k" represents the base value. The formula may be:

$$\text{The fourth force sensing value} = i \times \frac{j}{k}$$

Then, as shown in FIG. 9B, the fourth force-sensing values 504 of the coordinates (15,7) to (17,7) are 129, 234, 46, respectively. In particular, in order to avoid the negative sensing value becoming a larger positive sensing value after the calculation, the corresponding fourth force-sensing value 504 may be 0 or ignored if the maximum value of the touch-sensing values 401 is a negative value or 0. Correcting the force-sensing values by the touch-sensing values makes the force-sensing information more in line with the shape of the area contacted by the touch object, and further the accuracy of the force-sensing information is improved.

Fourth Embodiment

Figure 4B:
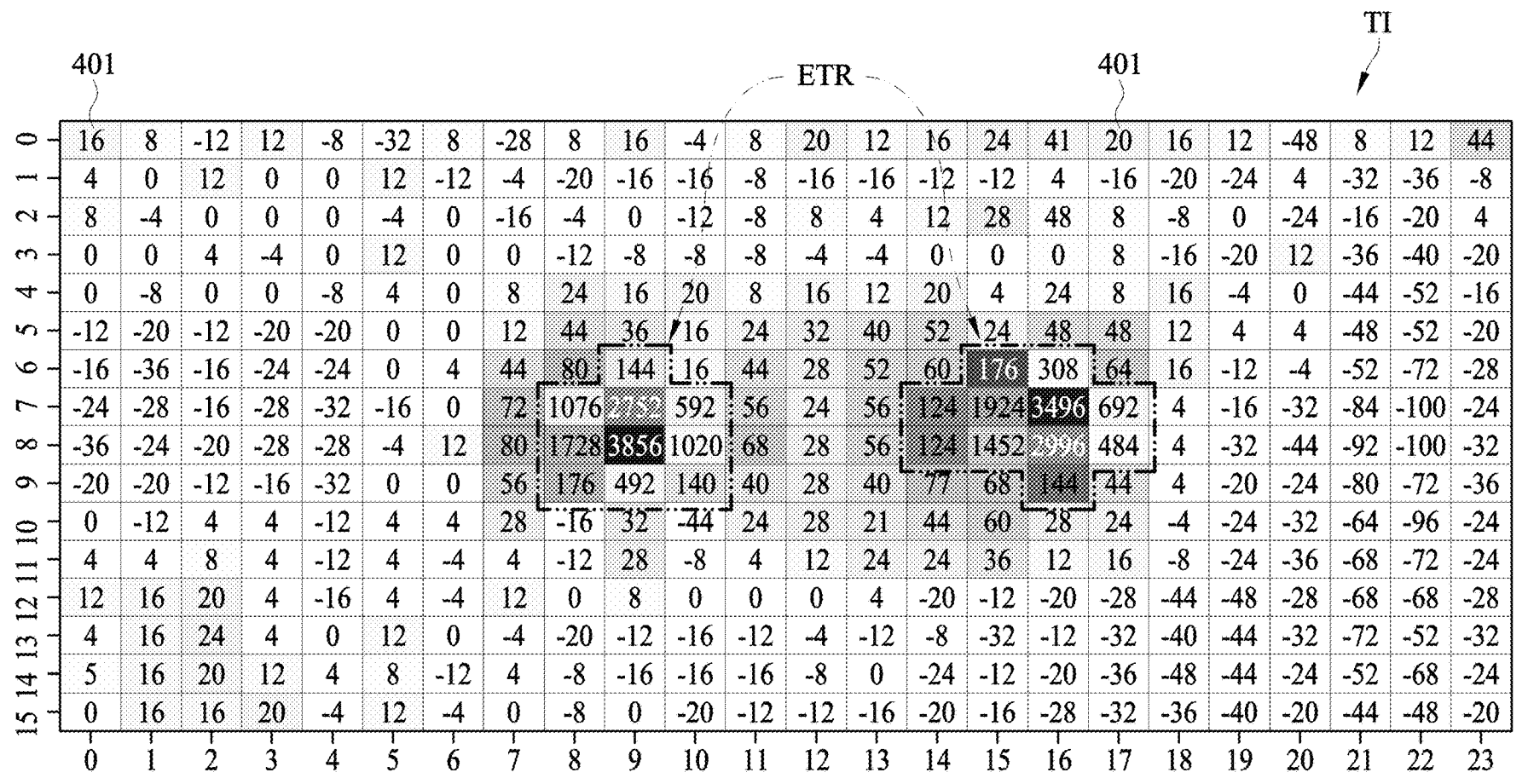
Figure 10A:
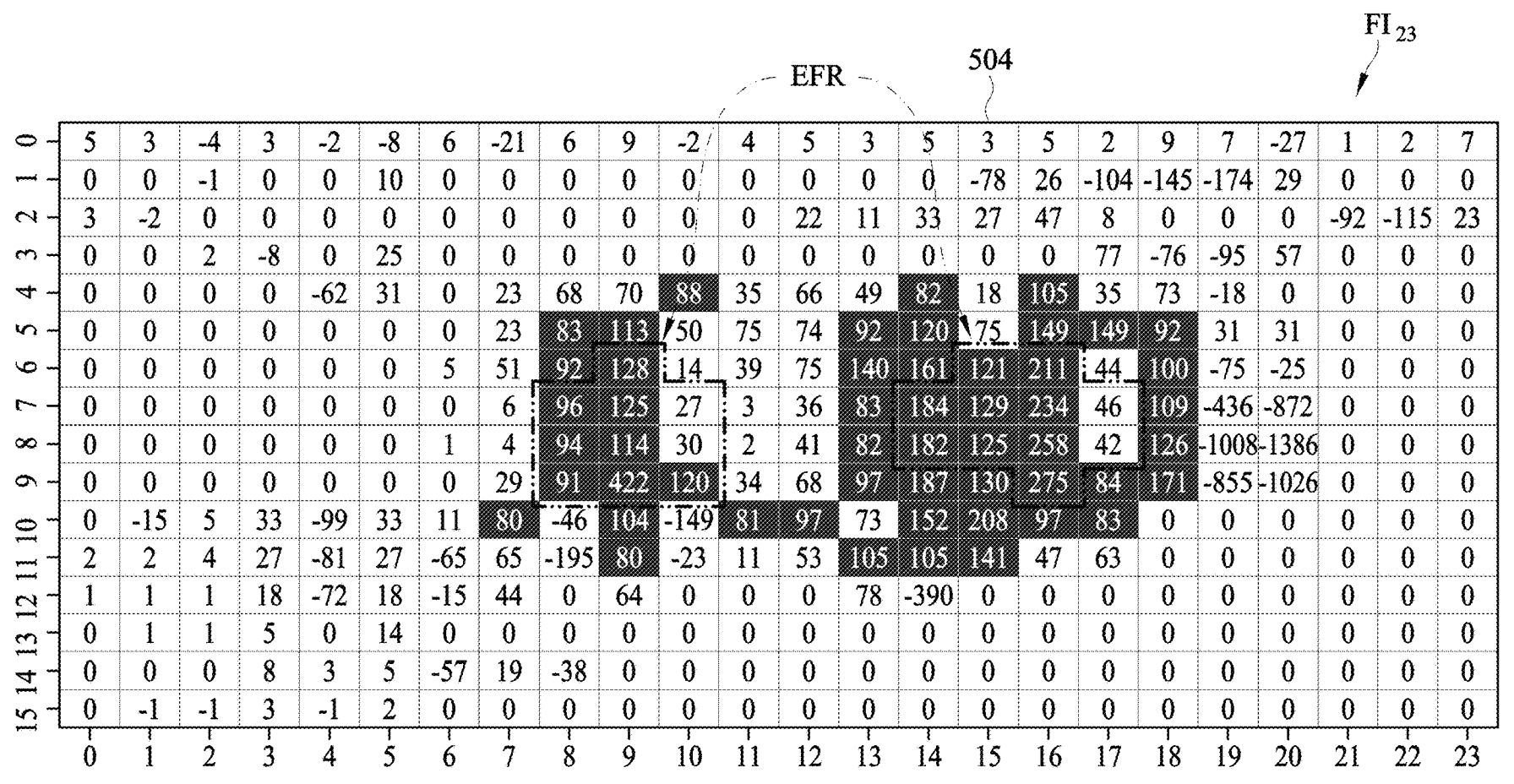
Figure 10B:
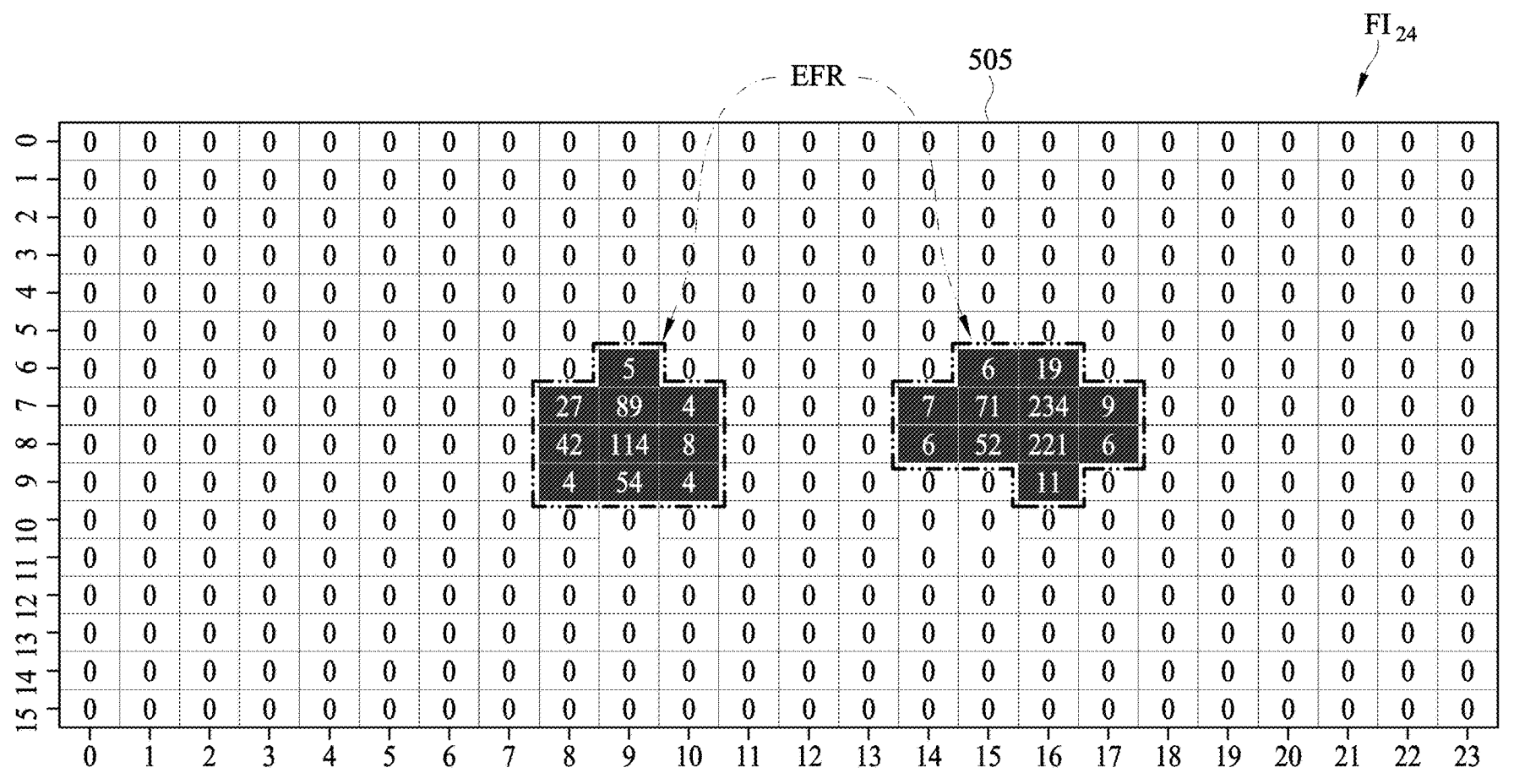

Further, the result of the previous embodiment may be selected an effective touch range ETR according to the touch-sensing information TI (as shown in FIG. 4B). According to the effective touch range ETR, an orthographic projection in the second force-sensing information $FI_{23}$ as shown in FIG. 9A is correspondingly provided to obtain an effective force-sensing range EFR (as shown in FIG. 10A). Still further, after the effective force-sensing range EFR is obtained, the maximum value in the effective touch range ETR is further used as a correction value. After each of the fourth force-sensing values 504 in the effective force-sensing range EFR is calculated according to the correction value, a corresponding fifth force-sensing value 505 is obtained. A second force-sensing information $FI_{24}$ is constituted by the fifth force-sensing value 505. Many kinds of operation formulas may be used, and the following formulas are examples, but not limited thereto. The following calculation symbols are used, "e" represents the fourth force-sensing value, "f" represents the touch-sensing value, and "g" represents the correction value. The formula may be:

$$\text{The fifth force sensing value} = e \times \frac{f}{g}$$

Figure 10C:
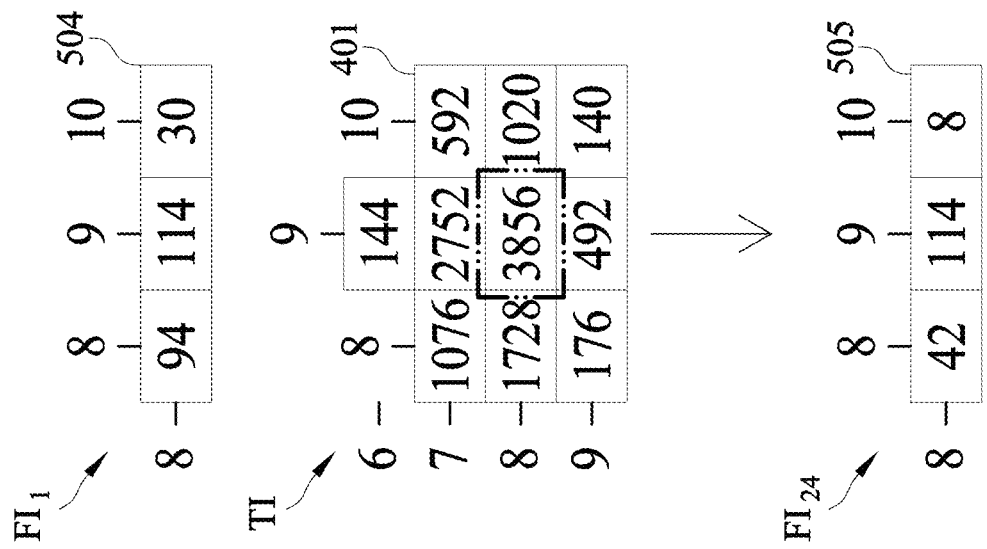
FIG. 10C is an illustrative view of a calculation of the second force-sensing information in FIG. 10B.

For example, the fourth force-sensing value 504 of the coordinates (8, 8) to (10, 8) in the second force-sensing information $FI_{23}$ shown in FIG. 10A are used as an example. The fourth force-sensing values 504 of these coordinates are 94, 114, and 30, respectively. The maximum touch-sensing value 401 selected in the corresponding effective touch-sensing range ETR is 3856 as the correction value. The fifth force-sensing values 505 obtained in the second force-sensing information $FI_{24}$ are 42, 114, and 8, respectively, after calculation according to the aforementioned formula as shown in FIG. 10C. In this way, in addition to eliminating the noise interference in the non-object touch area through the effective touch range ETR, the accuracy of judging the force applied by the object is effectively improved. The force-sensing values are corrected through the touch-sensing value, so that the force-sensing information is more in line with the shape of the area touched by the touch object, and the accuracy of the force-sensing information is improved.

Moreover, the second force-sensing information $FI_{21}$, $FI_{22}$, $FI_{23}$, $FI_{24}$ obtained by the calibration method as described may be processed by an image filter to remove noise and make the edge of the image presented by each adjacent force-sensing value in the second force-sensing information smoother.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A force-sensing data calibration method of a touchpad, wherein the touchpad comprises a force-sensing layer and a touch-sensing layer, the force-sensing layer includes x*z force-sensing points arranged in a matrix, the touch-sensing layer includes y*z touch-sensing points arranged in a matrix, each of the force-sensing points corresponds to n of the touch-sensing points, y is equal to x*n, n and y are positive integers greater than 1, x and z are positive integers greater than or equal to 1, and the method comprises steps of:
   a. receiving a first force-sensing information detected by the force-sensing layer, and receiving a touch-sensing information detected by the touch-sensing layer, wherein the first force-sensing information includes x*z first force-sensing values respectively corresponding to the x*z force-sensing points;
   b1. designating each of the first force-sensing values in the first force-sensing information to coordinates of n of the touch-sensing points as n second force-sensing values so that y*z second force-sensing values are obtained to constitute a third force-sensing information; and
   b2. adjusting the third force-sensing information according to the touch-sensing information to constitute the second force-sensing information.

2. The method as claimed in claim 1, wherein the step b2 comprises steps of:
   b21. selecting an effective touch range based on the touch-sensing information, and obtaining an effective force range by projecting orthographically the effective touch range to the third force-sensing information; and
   b22. retrieving the second force-sensing values of the effective force range to constitute the second force-sensing information.

3. The method as claimed in claim 1, wherein in the step b1, determining as an invalid force-sensing point when the force-sensing point has the first force-sensing value smaller than a force-sensing threshold and excluding the invalid force-sensing point from the second force-sensing information.

4. The method as claimed in claim 1, wherein in the step b1, determining as an invalid touch-sensing point when the touch-sensing point has the touch-sensing value smaller than a touch-sensing threshold and excluding a force-sensing point from the second force-sensing information corresponding to the invalid touch-sensing point.

5. The method as claimed in claim 1, wherein the step b2 comprises steps of:
   b21. selecting an effective touch range based on the touch-sensing information, and obtaining an effective force range by projecting orthographically the effective touch range to the third force-sensing information; and
   b22. retrieving a correction value from the touch-sensing values in the effective touch range; and
   b23. obtaining multiple third force-sensing values by calculating the second force-sensing values in the effective force range with the correction value, wherein the third force-sensing values constitute the second force-sensing information.

6. The method as claimed in claim 5, wherein the correction value is a maximum value in the effective touch range.

7. The method as claimed in claim 5, wherein a calculating formula in the step b23 is that each of third force-sensing values is equal to a corresponding one of the second force-sensing values times a corresponding one of the touch-sensing values divided by the correction value.

8. A force-sensing data calibration method of a touchpad, wherein the touchpad comprises a force-sensing layer and a touch-sensing layer, the force-sensing layer includes x*z force-sensing points arranged in a matrix, the touch-sensing layer includes y*z touch-sensing points arranged in a matrix, each of the force-sensing points corresponds to n of the touch-sensing points, y is equal to x*n, n and y are positive integers greater than 1, x and z are positive integers greater than or equal to 1, and the method comprises steps of:
  a. receiving a first force-sensing information detected by the force-sensing layer, and receiving a touch-sensing information detected by the touch-sensing layer, wherein the first force-sensing information includes x*z first force-sensing values respectively corresponding to the x*z force-sensing points;
  b1. designating one of the touch-sensing value of n of the touch-sensing points corresponding to one of the force-sensing points as a base value; and
  b2. obtaining y*z fourth force-sensing values by calculating the first force-sensing values respectively with the corresponding base values to obtain a second force-sensing information, wherein a resolution of the second force-sensing information is n times a resolution of the first force-sensing information.

9. The method as claimed in claim 8, wherein the y*z fourth force-sensing values constitute the second force-sensing information.

10. The method as claimed in claim 8, wherein the step b2 comprises steps of:
  b21. obtaining y*z fourth force-sensing values by calculating the first force-sensing values respectively with the base values;
  b22. selecting an effective touch range based on the touch-sensing information, and obtaining an effective force range by projecting orthographically the effective touch range to the third force-sensing information; and
  b23. retrieving the fourth force-sensing values in the effective force range to constitute the second force-sensing information.

11. The method as claimed in claim 8, wherein the step b2 comprises steps of:
  b21. obtaining y*z fourth force-sensing values by calculating the first force-sensing values respectively with the base values;
  b22. selecting an effective touch range based on the touch-sensing information, and obtaining an effective force range by projecting orthographically the effective touch range to the third force-sensing information;
  b23. retrieving a correction value from the touch-sensing values in the effective touch range; and
  b24. obtaining multiple fifth force-sensing values by calculating the fourth force-sensing values in the effective force range with the correction value, wherein the fifth force-sensing values constitute the second force-sensing information.

12. The method as claimed in claim 11, wherein the correction value is a maximum value in the effective touch range.

13. The method as claimed in claim 11, wherein a calculating formula in the step b24 is that each of fifth force-sensing values is equal to a corresponding one of the fourth force-sensing values times a corresponding one of the touch-sensing values divided by the correction value.

14. The method as claimed in claim 10, wherein each of the base values is a maximum value, an average value or a sum of the touch-sensing values of the corresponding n of the touch sensing points.

15. The method as claimed in claim 11, wherein the corresponding base value for each force-sensing point is a maximum value, an average value or a sum of the touch-sensing values of the corresponding n of the touch sensing points.

16. The method as claimed in claim 10, wherein a calculating formula in the step b21 is that each of fourth force-sensing values is equal to a corresponding one of the first force-sensing values times a corresponding one of the touch-sensing values divided by the corresponding base value.

17. The method as claimed in claim 11, wherein a calculating formula in the step b21 is that each of fourth force-sensing values is equal to a corresponding one of the first force-sensing values times a corresponding one of the touch-sensing values divided by the corresponding base value.

18. The method as claimed in claim 8, wherein in the step b1, determining as an invalid touch-sensing point when the touch-sensing point has the touch-sensing value smaller than a touch-sensing threshold and excluding a force-sensing point corresponding to the invalid touch-sensing point from the second force-sensing information.

19. A touchpad comprising:
  a substrate having a force-sensing layer including x*z force-sensing points arranged in a matrix1, wherein x and z are positive integers greater than or equal to 1;
  a touch-sensing layer including y*z touch-sensing points arranged in a matrix, and each of the force-sensing points corresponds to n of the touch-sensing points, wherein y is equal to x*n, and n and y are positive integers greater than 1;
  a protective layer, and the touch-sensing layer disposed between the substrate and the protective layer;
  a deformable unit disposed between the substrate and the touch-sensing layer; and
  a controller electrically connected to the force-sensing layer and the touch-sensing layer, and executing following steps:
  a. receiving a first force-sensing information detected by the force-sensing layer, and receiving a touch-sensing information detected by the touch-sensing layer, wherein the first force-sensing information includes x*z first force-sensing values respectively corresponding to the x*z force-sensing points;
  b1. designating one of the touch-sensing value of n of the touch-sensing points corresponding to one of the force-sensing points as a base value
  b2. obtaining y*z fourth force-sensing values by calculating the first force-sensing values respectively with the corresponding base values to obtain the second force-sensing information, wherein a resolution of the second force-sensing information is n times a resolution of the first force-sensing information.

20. The touchpad as claimed in claim 19, wherein
the touch-sensing layer comprises a driving electrode layer and a receiving electrode layer;
the driving electrode layer is disposed between the receiving electrode layer and the force-sensing layer;
the driving electrode layer and the receiving electrode layer generate coupling capacitance to generate the touch-sensing information; and
the driving electrode layer and the force-sensing layer generate coupling capacitance to generate the first force-sensing information.

* * * * *